(12) United States Patent
Hauffen et al.

(10) Patent No.: US 8,510,080 B2
(45) Date of Patent: Aug. 13, 2013

(54) SYSTEM AND METHOD FOR MONITORING AND MANAGING UTILITY DEVICES

(71) Applicants: Paul Hauffen, Monrovia, CA (US); Sreeresh Sreedhar, Loma Linda, CA (US)

(72) Inventors: Paul Hauffen, Monrovia, CA (US); Sreeresh Sreedhar, Loma Linda, CA (US)

(73) Assignee: ID Modeling, Inc., Arcadia, CA (US)

( * ) Notice: Subject to any disclaimer, the term of this patent is extended or adjusted under 35 U.S.C. 154(b) by 0 days.

(21) Appl. No.: 13/748,549

(22) Filed: Jan. 23, 2013

(65) Prior Publication Data

US 2013/0138396 A1    May 30, 2013

Related U.S. Application Data

(60) Provisional application No. 61/589,701, filed on Jan. 23, 2012.

(51) Int. Cl.
*G06F 17/18* (2006.01)

(52) U.S. Cl.
USPC .......................................................... 702/181

(58) Field of Classification Search
USPC .......................................................... 702/181
See application file for complete search history.

(56) References Cited

U.S. PATENT DOCUMENTS

2011/0303310 A1* 12/2011 Klicpera ........................ 137/551
2011/0303311 A1* 12/2011 Klicpera ........................ 137/551

* cited by examiner

*Primary Examiner* — Aditya Bhat
(74) *Attorney, Agent, or Firm* — Christie, Parker & Hale, LLP

(57) ABSTRACT

A system and method for monitoring and managing utility devices is provided where performance data for each utility device is compared against performance criteria. A deficiency value is assigned to each utility device based on the comparison, and a composite deficiency surface is generated based on the deficiency values. The areas of the composite deficiency surface are classified into deficiency classes. A particular area on the composite deficiency surface associated with a particular deficiency class is identified, and a priority index for the identified area is determined based on the particular deficiency value. One or more of the identified areas of the composite deficiency surface are classified into one or more construction projects based on the priority index for the corresponding area, and at least one of the one or more construction projects is recommended to a user.

20 Claims, 13 Drawing Sheets

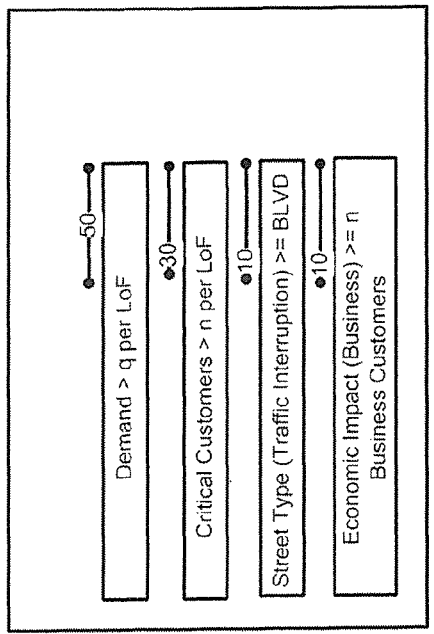
FIG 6A
FIG 6B
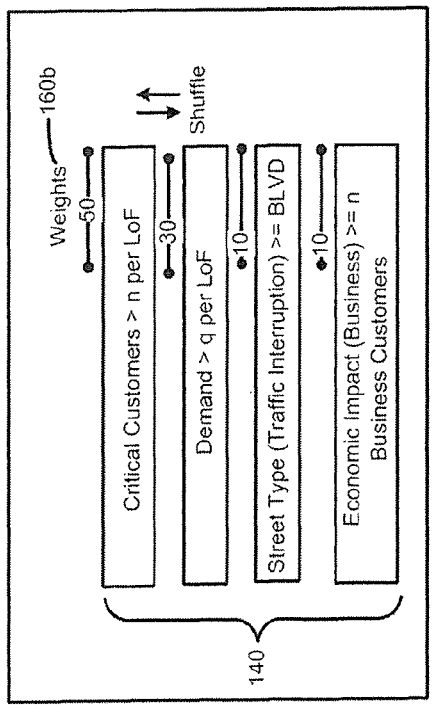
FIG 6C
Consequence of Failure Table (Before Shuffle)
| LoF Polygon ID | Critical Cust. | Demand | St. Type | Econ. Impact | Score |
|---|---|---|---|---|---|
| 1 | 50 |  | 10 |  | 60 |
| 2 |  | 30 |  |  | 30 |
| 3 | 50 |  |  |  | 50 |
FIG 6D
Consequence of Failure Table (After Shuffle)
| LoF Polygon ID | Critical Cust. | Demand | St. Type | Econ. Impact | Score |
|---|---|---|---|---|---|
| 1 | 30 |  | 10 |  | 40 |
| 2 |  | 50 |  |  | 50 |
| 3 | 30 |  |  |  | 30 |

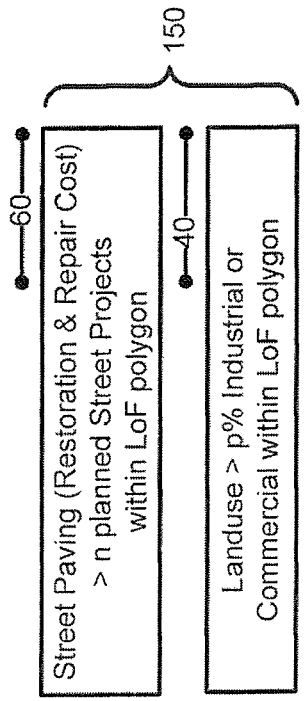
FIG. 9A
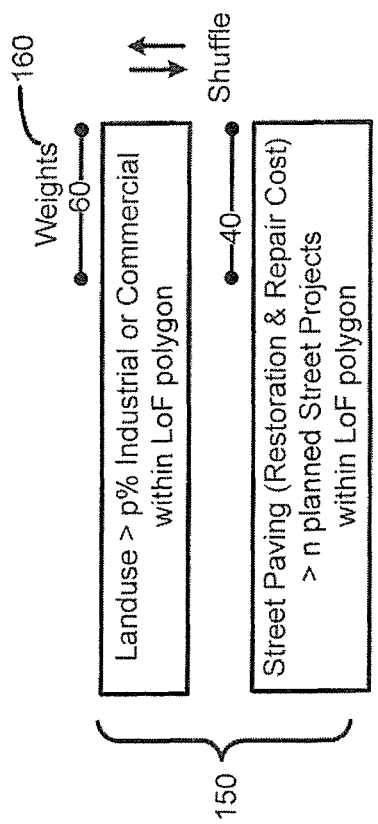
FIG. 9B
Ease of Construction Table (Before Shuffle) — 610a
| LoF Polygon ID | Landuse | Street Paving | Score |
|---|---|---|---|
| 1 | 60 | | 60 |
| 2 | | 40 | 40 |
| 3 | 60 | | 60 |
FIG. 9C
Ease of Construction Table (After Shuffle) — 610b
| LoF Polygon ID | Landuse | Street Paving | Score |
|---|---|---|---|
| 1 | 40 | | 40 |
| 2 | | 60 | 60 |
| 3 | 40 | | 40 |
FIG. 9D

CIP Reports 290

| Capital Project | | | | | | | | |
|---|---|---|---|---|---|---|---|---|
| CIP # | Capital Project Cost | # Cust. | # Defic. | # of Customer Complaints Addressed | # Critical Cust. | DollarsPer Customer (DpC) 300 | DollarsPer Deficiency (DpD) 310 | DollarsPer Customer Complaint (DpCC) 320 |
| 1 | $350,000 | 2000 | 10 | 200 | 4 | $175 | $35,000 | $1,750 |
| 2 | $300,000 | 1000 | 5 | 100 | 2 | $300 | $60,000 | $3,000 |
| 3 | $150,000 | 750 | 2 | 75 | 1 | $200 | $75,000 | $2,000 |

FIG. 13

SYSTEM AND METHOD FOR MONITORING AND MANAGING UTILITY DEVICES

CROSS-REFERENCE TO RELATED APPLICATIONS

This application claims the benefit of U.S. Provisional Application No. 61/589,701, filed on Jan. 23, 2012, the content of which is incorporated herein by reference.

BACKGROUND

Our population is increasing, further extending requirements on diminishing natural supplies such as water. With respect to water, global climate change and depleting water sources are converging with a rapidly deteriorating drinking water supply infrastructure and a constrained economy, positioning drinking water utilities within a historic confluence of challenges. Although utility management systems exist to address components of the current problem, these systems remain substantially disconnected within the utility sector, and fail to leverage certain utility information to deliver a complete, responsive, and integrated solution. The same is true with other types of utilities, such as electricity, gas, and the like.

SUMMARY

The present invention is directed to a method for monitoring and managing a plurality of utility devices installed throughout a geographic area. The method includes receiving performance data for each of the plurality of utility devices; comparing the performance data against one or more performance criteria; and assigning a deficiency value to each of the plurality of utility devices based on the comparison. The method also includes generating a composite deficiency surface based on the deficiency values of the plurality of utility devices; classifying one or more areas of the composite deficiency surface into one or more deficiency classes, wherein each of the one or more deficiency classes is associated with a range of deficiency values; identifying a particular area on the composite deficiency surface associated with a particular deficiency class; determining a priority index for the identified area based on the particular deficiency value; classifying one or more of the identified areas of the composite deficiency surface into one or more construction projects based on the priority index for the corresponding area; and recommending at least one of the one or more construction projects.

According to one embodiment of the invention, each of the plurality of utility devices is selected from a group consisting of a pipe and hydrant.

According to one embodiment of the invention, the method includes comparing the performance data of each of the plurality of utility devices against a preset value stored in a data store for determining anomaly in the performance data; and displaying the determined anomaly for visual attention.

According to one embodiment of the invention, the method includes visually highlighting the utility device based on the comparison of the performance data against the performance criteria.

According to one embodiment of the invention, the composite deficiency surface is a 3-dimensional surface including mounds and valleys representing deficiencies of the utility devices in the geographic area.

According to one embodiment of the invention, the composite 3-dimensional surface deficiency surface is classified into deficiency areas representing deficiencies and likelihood of failure of the utility devices in the geographic area.

According to one embodiment of the invention, the deficiency areas are grouped into a preset number of projects for addressing the deficiencies of the utility devices in the geographic area.

According to one embodiment of the invention, the method further includes filtering the performance data against one or more data anomaly criteria.

According to one embodiment of the invention, the method further includes determining impact of failure of one or more of the utility devices in the identified area.

According to one embodiment of the invention, the method further includes determining an ease of construction for the identified area.

According to one embodiment of the invention, the method further includes determining an actual cost of construction of assets within the project areas.

According to one embodiment of the invention, the method further includes reporting the value of each project with respect to number of customers positively affected, number of deficiencies, and number of customer complaints addressed.

According to one embodiment of the invention, the method further includes displaying a map highlighting a location of a project.

According to one embodiment of the invention, the plurality of utility devices includes valves.

According to one embodiment of the invention, the method further includes highlighting pumps and tanks as deficiency points.

According to one embodiment of the invention, the method further includes displaying one or more of the composite deficiency surface, likelihood of failure surface, impact surface, constructability surface, and priority index surface.

Embodiments of the present invention are also directed to a system for monitoring and managing a plurality of utility devices installed throughout a geographic area. The system includes a processor, and memory coupled to the processor and storing computer instructions therein. The computer instructions are for being executed by the processor and include: receiving performance data for each of the plurality of utility devices; comparing the performance data against one or more performance criteria; assigning a deficiency value to each of the plurality of utility devices based on the comparison; generating a composite deficiency surface based on the deficiency values of the plurality of utility devices; classifying one or more areas of the composite deficiency surface into one or more deficiency classes, wherein each of the one or more deficiency classes is associated with a range of deficiency values; identifying a particular area on the composite deficiency surface associated with a particular deficiency class; determining a priority index for the identified area based on the particular deficiency value; classifying one or more of the identified areas of the composite deficiency surface into one or more construction projects based on the priority index for the corresponding area; and recommending at least one of the one or more construction projects.

A person of skill in the art should appreciate that the system and method for monitoring and managing utility devices helps reduce asset loss, increase energy efficiencies, improve incident and emergency response, and prioritize capital projects for utility asset management.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 6A-6D are exemplary layout diagrams of tables including exemplary impact criteria and associated weights according to one embodiment of the invention;

FIGS. 9A-9B shows tables with exemplary ease of construction criteria and associated weights according to one embodiment of the invention;

FIGS. 9C and 9D show tables with exemplary cost of failure values for the criteria and weights in respectively FIGS. 9A and 9B according to one embodiment of the invention;

FIG. 13 is a layout diagram of a table including value information for different projects according to one embodiment of the invention.

DETAILED DESCRIPTION

In general terms, embodiments of the present invention are directed to a system and method for monitoring, reporting, analyzing, and forecasting deficiencies in utility devices for responsive, proactive decision making (hereinafter generally referred to as monitoring and managing utility devices). The utility devices are described herein as being devices, also referred to as assets, of a water system (e.g. pipes, hydrants, valves, pumps, tanks, etc.). A person of skill in the art should recognize, however, that the present invention is not limited to water systems, and may extend to other utility systems such as wastewater, recycled water, electric, gas, and the like, as will be understood by a person of skill in the art. Embodiments of the present invention may also be used to monitor and manage any other type of natural resource (e.g. surface water, ground water, forestry, petroleum, and the like), and man-made assets, as will also be understood by a person of skill in the art.

According to embodiments of the present invention, the monitoring, analyzing, and forecasting of deficiencies includes forecasting likelihoods of failure of monitored utility devices and estimating an impact of such failure on business, community, and the like. The analyzing further includes estimating costs/hardships of replacing or reconstructing the devices. Construction projects may be recommended based on the estimates, available budget, and the like. Embodiments of the present invention also provide a composite view of deficiencies in the assets in a particular geographic area via a 3 dimensional surface diagram where deficiencies are visually highlighted (via color, change in elevation, and/or the like).

Figure 1:
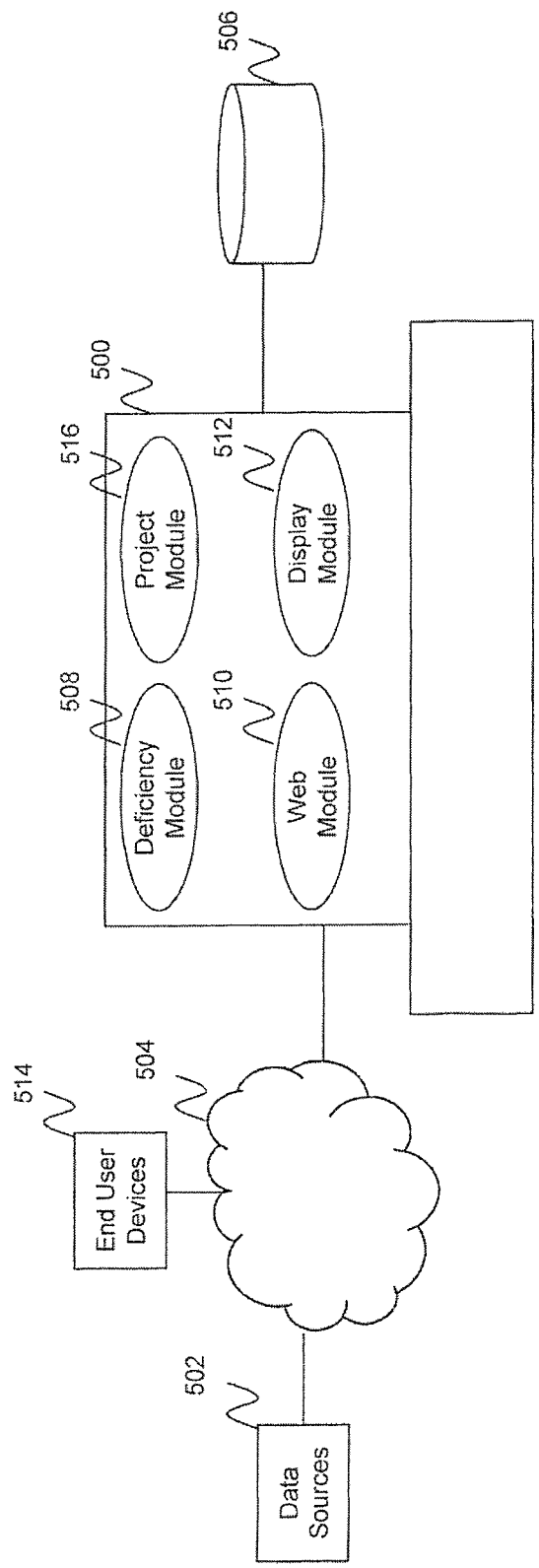
FIG. 1 is an exemplary block diagram of a system for monitoring and managing utility devices according to one embodiment of the invention.

FIG. 1 is an exemplary block diagram of a system for monitoring and managing utility devices according to one embodiment of the invention. The system includes a computer device 500 or a cluster of computer devices in a cloud or virtualized environment, configured to receive real-time, near real-time, and/or non-real-time data from various data sources 502 relating to performance of one or more assets located in a geographic location. The data sources 502 may provide the performance data to the computer device 500 over a data communications network 504. The data communications network 504 may be a local area network, wide area network, or a public wide area network such as, for example, the Internet.

The computer device 500 includes a central processing unit (CPU) configured to execute software instructions and interact with other system components for monitoring and managing one or more utility systems. An input device such as a mouse-type controller or keyboard, facilitates user control of the operation of the computer device.

The computer device also includes a mass storage device 506 that provides long-term storage of data and/or software programs used for the monitoring and managing of the utility system. The mass storage device may be implemented as a hard disk drive, drive array, or other suitable mass storage device conventional in the art.

The computer device 500 also includes an addressable memory for storing software instructions to be executed by the CPU. The memory is implemented using a standard memory device, such as a random access memory (RAM). In one embodiment, the memory stores one or more software objects or modules, including a deficiency, impact, and constructability module (hereinafter referred to as a "deficiency module") 508. According to one embodiment, the deficiency module is configured to forecast the likelihood of failure (LoF) of a utility device, compute the consequence or impact of such failure, and compute the constructability of a project to replace the utility device.

Other modules and/or objects may also be included. For example, the computer device 500 may include a web module 510 for receiving data from the data sources 502 relating to assets that are being monitored, customer data, geographic data, and/or the like, over the web. Some of the data may be received by the web module 510, for example, on a subscription basis. The web module 510 may also be configured to provide a graphical user interface for allowing a utility user to access the functionalities provided by the computer device in a user friendly manner. The graphical user interface may be accessed via end user devices 514 which may include personal computers, laptops, mobile devices, electronic tablets, mobile phones, and the like. One or more of the devices 514 may include a web browser for accessing the graphical user interface and functionalities of the computer device over the web.

The computer device 500 may further include a display module 512 for providing intelligent web maps of utility systems, deficiency surface diagrams, LoF surface diagrams, impact surface diagrams, constructability surface diagrams, priority surface diagrams, project maps, graphs, reports, alarms, and the like. A project module 516 may be configured to prioritize construction projects based on, for example, likelihood of failure scores, impact scores, constructability scores, available budget, construction cost, and a number of projects desired to be tackled. Throughout this discussion, the foregoing objects or modules are assumed to be separate functional units, but those skilled in the art will recognize that the functionality of various units may be combined or integrated into a single module, or further subdivided into further sub-modules without departing from the spirit of the invention.

According to one embodiment, the data sources 502 include, without limitation, database systems, mobile devices, personal computers, and the like. Field personnel may have access to the mobile devices to provide real-time data on asset performance via, for example, inspection of the assets from the field. In this regard, the mobile devices may be equipped with a front-end user interface provided via a variety of hardware/software combinations such as web browsers and/or native applications running on the mobile devices. In this regard, the mobile devices may include personal computers, electronic tablets, smart phones, and the like.

According to one embodiment, the data sources 502 may also include well known enterprise systems that identify system wide deficiencies and communicate those deficiencies to the computer device 500 over the data communications network 504 according to well-known mechanisms that will be understood by a person of skill in the art. For example, a third party geographic information system (GIS), conventional in the art, may provide a data model representing geographic objects (e.g. assets) or surfaces on which the objects are installed. Also, a supervisory control and data acquisition (SCADA) system, conventional in the art, may monitor and control asset infrastructure and processors, and provide such monitoring information to the computer device 500 for use in making deficiency calculations. In yet another example, an advanced metering infrastructure (AMI), conventional in the art, may measure, collect and analyze consumption usage, and communicate the gathered information to the computer device 500. In some embodiments, sensors (acoustical, mechanical, optical, thermal, electromagnetic, etc.) or other monitoring devices may be used according to conventional mechanisms to automatically collect condition information of various monitored assets and forward such information to the computer device 500.

Figure 2:
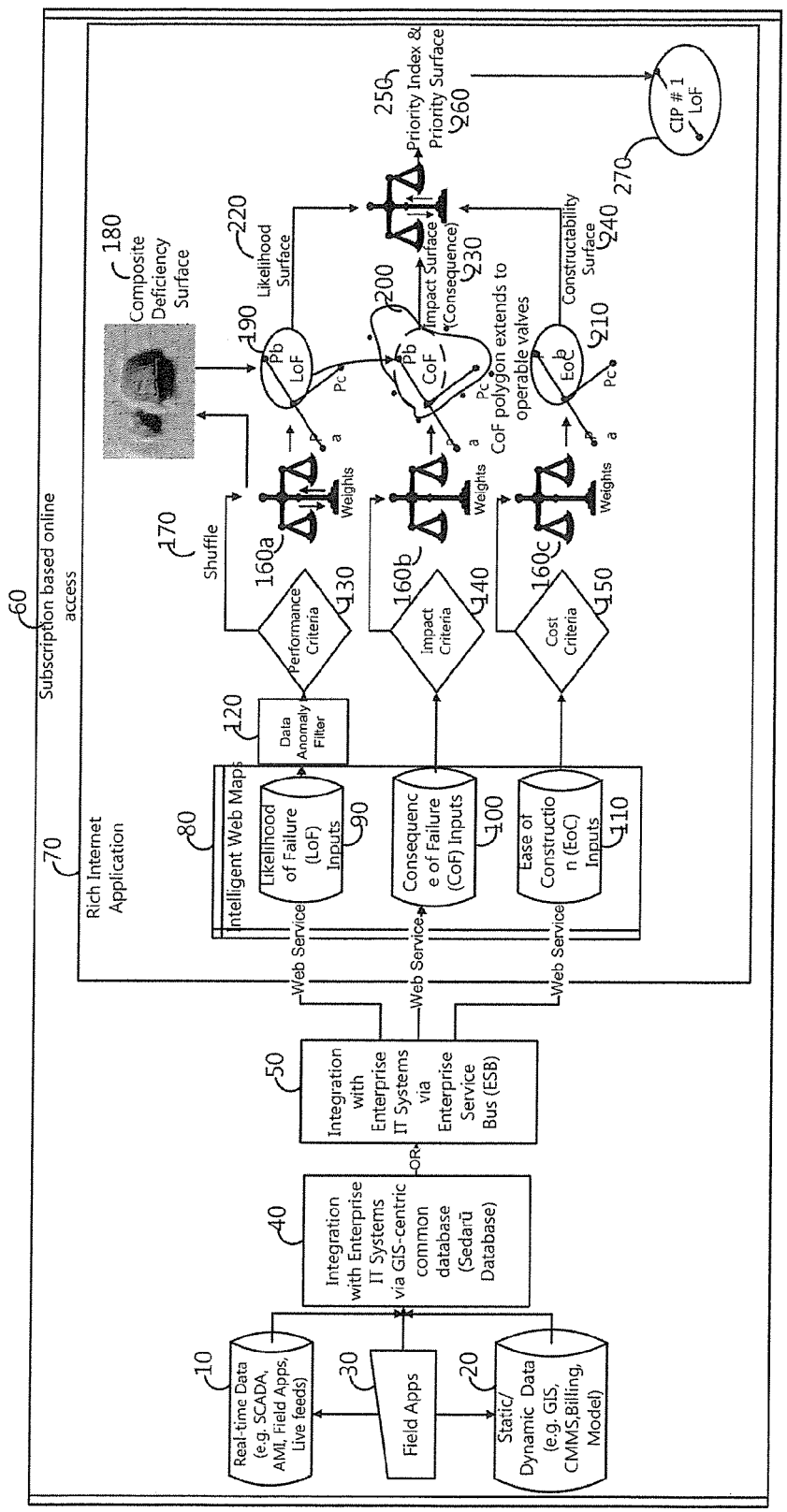
FIG. 2 is a conceptual workflow diagram of various software components associated with the system of FIG. 1 according to one embodiment of the invention.

FIG. 2 is a conceptual workflow diagram of various software components associated with the system of FIG. 1 according to one embodiment of the invention. According to one embodiment, one or more of the various data sources 502 of FIG. 1 are configured with real-time data applications 10 (e.g. SCADA, AMI, field applications, live feeds) for collecting and/or providing real-time data regarding asset performance and other live data (e.g. data relating to traffic, earthquakes, weather, etc.) which may be useful for deficiency, impact, and constructability calculations. One or more of the data sources 502 may also include applications for providing static and dynamic data 20 (e.g. GIS, a computerized maintenance and management system (CMMS), work orders, customer complaints, and hydraulic models), as well as field applications 30 that provide real-time, ground-verified deficiency identification for monitored assets. The field applications may be installed, for example, in a field engineer's mobile phone, electronic tablet, laptop, and/or the like.

According to one embodiment, data provided by the various data collection applications are integrated into existing enterprise systems via, for example, an enterprise service bus (ESB) 50 or via a GIS-centric common database 40. An enterprise service bus (ESB) is a software architecture model used for designing and implementing the interaction and communication between mutually interacting software applications in a service-oriented architecture (SOA) as will be understood by a person of skill in the art. If a utility system already has an implemented ESB, the computer device 500 interacts with it using web services to collect necessary data and post analysis results.

A GIS-centric common database allows the computer device 500 to store data within the mass storage device 506 for display and analysis within a mapping environment. According to one embodiment, this is the default approach unless the ESB is present.

According to one embodiment, the functionalities of the various modules of the computer device 500 are invoked via a subscription based online access 60. In this regard, a utility user invokes the end user device 514 to accesses a web link (e.g. URL), and provides his or her username/password to the web module 510. Access to the functionalities of the various modules may be restricted, for example, based on the user's subscription level. According to one embodiment, in response to the online access by the user, the web module provides a web application (e.g. a rich internet application) to a web browser of the end user device 514. The web application may be configured, for example, to provide intelligent web maps 80 of a utility system along with basic pan, zoom, identify, search, spatial and data analysis functionality. According to one embodiment, web maps are created using standard mapping software applications such as Esri's ArcGIS for Server, Google Maps, and the like. The web application may further provide a graphical user interface for allowing a user to provide input and/or commands relating to the monitoring and managing of utility devices.

According to one embodiment, the deficiency module 508 receives (either directly for via the web module 510) likelihood of failure (LoF) inputs (also referred to as performance data) 90 for the monitored assets to evaluate a likelihood of failure of those assets. According to one embodiment, the LoF inputs are based on the data provided by the various applications 10-30. For example, for a water system, the LoF inputs may relate to performance of pipes, hydrants, valves, pumps, tanks, and the like, and may be based on real-time monitoring of performance of these assets, customer complaints and/or observations relating to the assets, work orders relating to the assets, and the like.

The deficiency module 508 further receives (either directly for via the web module 510) consequence of failure (CoF) inputs 100 for evaluating the impact to customers, demand, traffic, business, and the like, in the event of failure of the monitored assets. According to one embodiment, the CoF data may be from information provided by the integrated enterprise IT systems (e.g. based on customer billing information), the GIS-centric database 40, available hydraulic models, and information available online (e.g. street types from geocoding services, business density/transaction information, etc).

The deficiency module 508 receives (either directly for via the web module 510) construction (EoF) inputs 110 for evaluating the ease and/or cost of restoring and/or repairing the monitored assets. The information relevant for this evaluation may be, for example, inventory of land use (low, medium, high density). For example, the deficiency module 508 may be configured with an algorithm where the cost and difficulty values for the restoration and repair of an asset is proportional to the density of the land use.

According to one embodiment, the deficiency module 508 includes a data anomaly filter 120 configured to filter and display erroneous performance data provided to the deficiency module. In this regard, the filter has access to a preset range of acceptable values of performance data selected based on, for example, OEM specifications, statistical analysis of historic data, comparison with similar systems, and the like. Performance data outside of the preset range are flagged as being erroneous and, according to one embodiment, discarded. The erroneous data may also be displayed and/or visual alerts may be provided to the end user devices 514 to alert users of the erroneous data.

According to one embodiment, a user invoking the deficiency module 508 defines one or more performance criteria 130, impact criteria 140, and cost criteria 150, and saves the criteria into a performance profile. The user may also select one of various preset profiles matching a desired risk profile (e.g. conservative, moderate, aggressive, and custom). The preset profiles may allow customization by offering userchangeable layers (as described below) and weights. In this regard, the mass storage device 506 stores a set of performance criteria for each asset type based on input from utilities of difference sizes. According to one embodiment, the performance criteria are made available online for sharing and collaboration with others.

According to one embodiment, the mass storage device 506 may also store a preset disaster profile that may be selected to plan for disaster mitigation.

According to one embodiment, the user invoking he deficiency module may assign weighs 160a-c to the various criteria. The weights may be selected via a sliding scale or via a shuffle mechanism 170. If a sliding scale is used, the user may drag the slider in preset directions to interactively assign a weight (e.g. between 0-100) for each criterion. According to one embodiment, each of the criteria is included in the web map 80 as a layer, and also included in a table of contents. A user may view the table of contents and shuffle the order of the displayed layers to assign weights. According to one embodiment, a criteria appearing in a layer above a criteria in a lower layer is assigned a weight that is higher than the weight in the lower layer.

The deficiency module 508 is configured to apply the performance criteria 130 and associated weighs 160a of a selected performance profile, against the input performance data 90, and calculate a deficiency score for an asset (e.g. for a pipe, hydrant, valve, etc.)

According to one embodiment, the display module 512 is invoked with the deficiency scores to visually represent system deficiencies as 3-dimensional (3D) composite deficiency surface 180. According to one embodiment, the composite deficiency surface 180 represents higher deficiencies as mounds and lower deficiencies as valleys using known elevation surface creation techniques. For a water utility, deficiencies from pipes, hydrants, and valves are used as elevation values to create an interpolated surface.

According to one embodiment, users are alerted about real-time deficiencies as they happen, via animated graphics. In this regard, the web module 510 provides to one or more subscribed end user devices 514, animated graphics (e.g. blinking) for deficiencies that have occurred within a particular time frame (past hour, last day, last month, etc.). According to one embodiment, displays for data anomaly due to erroneous performance data caught by the data anomaly filter 120 is visually distinguished from the displays provided for the real-time deficiency feeds.

According to one embodiment, the deficiency module 508 is configured to classify deficiency mounds into a number of likelihood of failure polygons 190, or classes, based on the deficiency score. According to one embodiment, areas with highest scores become high LoF polygons while areas with low deficiency scores become low LoF polygons. The deficiency module is also configured to assign a LoF score to each LoF polygon based on a comparison of the LoF inputs 90 against the performance criteria 130 and associated weights 160a. According to one embodiment, the display module 512 may be configured to display a 3D LoF surface 220 using the LoF score as elevation. According to one embodiment, a difference between a composite deficiency surface 180 and a LoF surface 220 is that the former has a gradual change in elevation between valleys and peaks (like a terrain) while the LoF surface has constant and abrupt elevations within the entire extent of the LoF polygon (e.g. similar to a building).

The deficiency module 508 is also configured to delineate consequence of failure (CoF) polygons 200 by extending, for example, the LoF polygons until operable assets (e.g. valves) are found. The deficiency module is also configured to assign a CoF score to each CoF polygon based on a comparison of the CoF inputs 100 against the impact criteria 140 and associated weights 160b. The display module 512 may be configured to display a 3D impact surface 230 using the CoF score as elevation.

The deficiency module 508 is further configured to generate ease of construction (EoC) polygons 210 and assign an EoC score to each EoC polygon based on a comparison of the EoC inputs 110 against the cost criteria 150 and associated weights 160c. The display module 512 may be configured to display a 3D constructability surface 240 using the EoC score as elevation.

According to one embodiment, the generated LoF, CoF, and EoC scores associated with each LoF polygon is provided to the project module for generating a priority index 250 for prioritizing projects to be tackled based on the LoF, CoF, and EoC scores. Although a CoF polygon may have a larger extent than the corresponding LoF polygon, the CoF values from the larger extent are transferred to the corresponding LoF extent when computing the priority index. The display module 512 may also be invoked to display a composite priority surface 260 using the priority index as elevation.

According to one embodiment, once the project module 516 calculates the priority index for each LoF polygon, the polygons may be classified into a fixed number of projects (e.g. 5) using, for example, Jenks Natural Break Optimization or other known statistical classification techniques such as, for example, Equal Interval (wherein range of values are divided into a number of classes), Equal Area (wherein each new class represents a similar amount of area), and the like. Users may specify a smaller number of slices (e.g. 3) so that they can aggregate LoF polygons into a manageable number of projects. Once the final list of projects is identified, users may choose to merge all projects that are within the extent of its CoF polygon so that once a particular area is isolated for project work, other projects that are within the isolated area can also be constructed. According to one embodiment, such merge ignores the variance of individual projects that are merged.

Figure 3C:
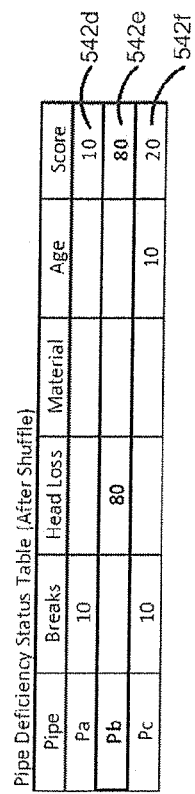
FIGS. 3A-3D are conceptual layout diagrams of performance profiles and associated tables that may be stored for pipes according to one embodiment of the invention.
Figure 3D:
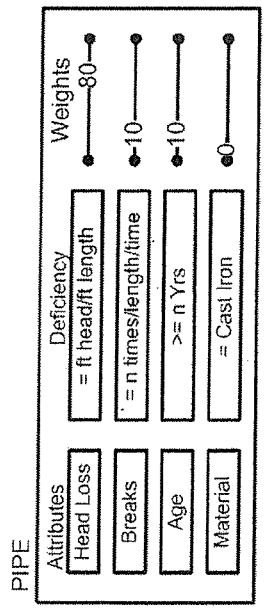
Figure 3A:
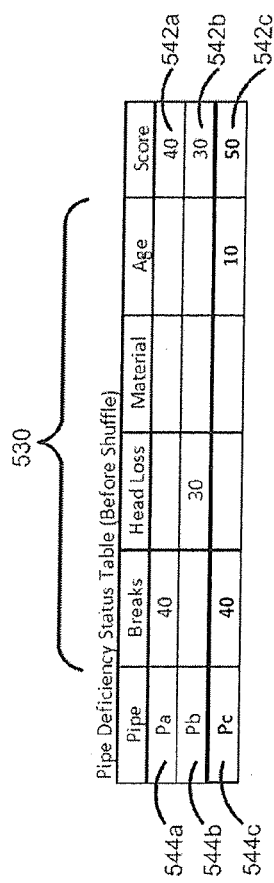

FIGS. 3A-3D are conceptual layout diagrams of performance profiles and associated tables that may be stored for pipes according to one embodiment of the invention. A person of skill in the art should recognize that similar performance profiles may be stored for other types of utility devices as will be apparent to a person of skill in the art. A performance profile may include, for example, one or more performance attributes 530 for the particular type of utility device, associated performance criteria (or rules) 532, and associated weights 534. The performance criteria 532 and weights 534 may be similar to the performance criteria 130 and weights 160a of FIG. 2. Performance criteria may be defined for each attribute for determining whether a deficiency exists with respect to the attribute. For example, a first criteria for a pipe may state that if a pipe breaks a certain number of times during a particular period of time, there is a likelihood of failure of the pipe. The extent in which the particular criteria will be considered influential in determining the likelihood of failure (or deficiency of the device) depends in the weight 534 assigned to the attribute. In the example of FIG. 3A, a second criteria below the first criteria states that if a pipe suffers a particular amount of headloss, this also contributes to the likelihood of failure of the pipe. However, since the weight associated to this attribute/criteria combination is less than the weight associated to the "break" attribute/criteria combination, it has a lesser influence in determining the likelihood of failure of the pipe.

According to one embodiment, users can prioritize the attributes by assigning/reassigning weights. In the example of FIG. 3A, the "break" attribute is assigned a weight of 40 and the "headloss" attribute is assigned a weight of 30. If, however, a user determines that the "headloss" attribute should be treated with higher priority since it has a bigger influence in predicting the likelihood of failure of a pipe than the "break" attribute, the user may give a higher weight of 40 to the "headloss" attribute and a lower weight of 30 to the "break" attribute. The weights are assigned so that the sum of weights within each utility device class adds up to 100 (e.g. the sum of all attribute weights for a pipe class equals 100). Once generated, the performance profile is stored in the mass storage device 506 in association with the particular asset type/class and/or entity for which the profile was generated. The performance profile may also be associated with a particular risk level (e.g. conservative or aggressive).

Figure 3B:
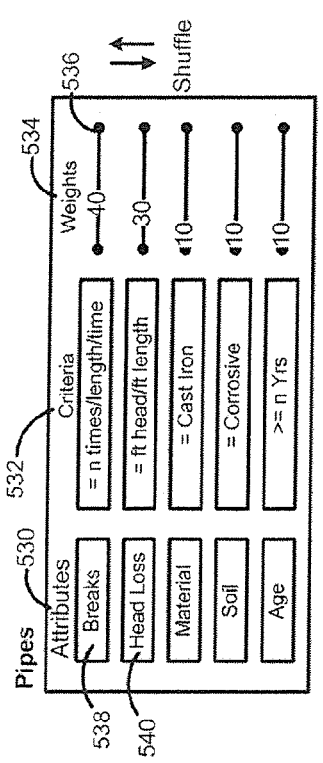

According to an embodiment of the invention, assigned weights may be reassigned by, for example, shuffling the order of the attributes. FIG. 3B shows the attributes of FIG. 3A after being shuffled by the user. The user may shuffle the attributes by a drag and drop mechanism where the user selects a row with an attribute to be moved, and drags and drops the row into a position. According to one embodiment, each attribute row 538 is associated with a specific weight, and the specific weight that is assigned to the attribute depends on the row in which that attribute is placed. For example, in the example of FIG. 3A, any attribute placed in row 538 is associated with weight 40, while any attribute placed in row 540 is associated with weight 30.

Other mechanisms for assigning and/or reassigning weights are also contemplated as will be evident to a person of skill in the art. For example, users may change the weights by manually sliding a weight slider 536. According to this example, when the weight manually assigned via the weight slider for an attribute in a lower row is higher than the weight assigned to an attribute at a higher row, the order of the attributes is automatically shuffled so that higher weight attributes appear in a row above the lower weight attributes.

As another embodiment of the invention, a total deficiency score of each utility device class is prioritized using weights. The sum of weights for each device class adds to 100 (e.g. the sum of weights of pipes, hydrants, and valves equals 100).

FIG. 3C shows a table with deficiency scores 542a-542c assigned to specific utility devices 544a-544c based on calculations for each performance attribute 530 based on the input performance data 90 (FIG. 2) and the associated performance criteria 532 and weights 534, according to one embodiment of the invention.

FIG. 3D shows a table with deficiency scores 542d-542f calculated based on the reshuffled performance attributes and associated weights shown in FIG. 3B.

Figure 4:
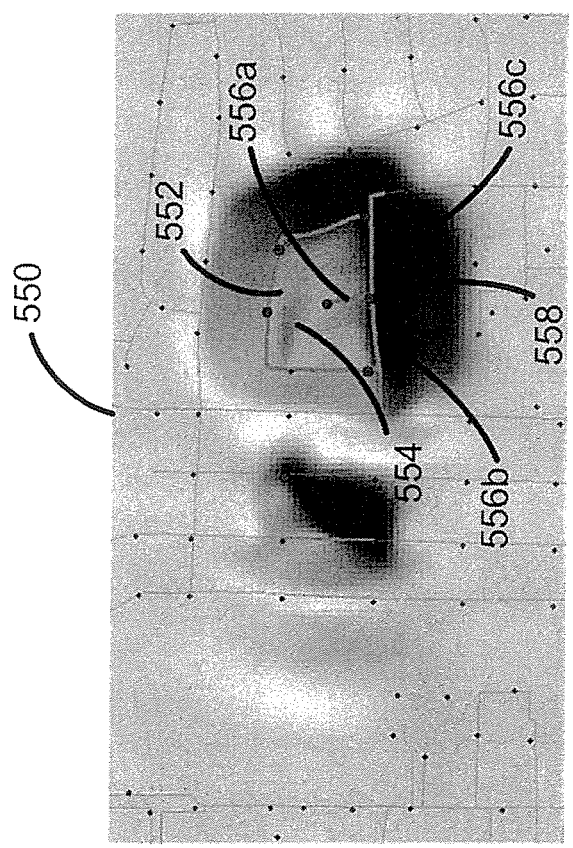
FIG. 4 is a screen shot of a composite 3D deficiency surface for depicting deficiencies of various assets in a geographic area according to one embodiment of the invention.

FIG. 4 is a screen shot of a composite 3D deficiency surface 550 for depicting deficiencies of various assets in a geographic area according to one embodiment of the invention. In the example shown in FIG. 4, the composite deficiency surface is a 3-dimensional surface with mounds and valleys, resembling that of a ground surface with changing elevation, that represent aggregated deficiencies of various assets (e.g. pipes, hydrants, and valves) in the geographic area. For example, areas of deficiencies are represented as mounds 552 and areas of no deficiencies are represented as valleys 554. Transition from high deficiencies to low deficiencies is represented as slope of the mounds. According to one embodiment, the total number of deficiencies, weighted on each device including, for example, pipes, hydrants, and valves, are used as elevation values to create mounds and valleys having interpolated surfaces. Thus, if a pipe 556a (depicted as a line) is deemed to have a deficiency score of 10, and a hydrant 558 connected to the pipe (depicted as a point) is deemed to have a deficiency score of 30, the area surrounding the line and the hydrant is depicted as an upward sloping hill where the bottom of the hill has an elevation of 10, and the top of the hill with the valve has an elevation of 30. In this example, if there are other pipes (e.g. 556b, 556c) joined to the same hydrant 558, the deficiencies of the pipes that are joined to the hydrant increases or decreases the final interpolated elevation near the mound based on the connecting pipes' deficiency scores. According to one embodiment, each asset depicted on the map is associated with geographic coordinates stored in the mass storage device (as obtained from a GIS database) for discerning the geographic location of the pipes.

According to one embodiment, deficiencies of certain assets such as, for example, pump and tank deficiencies (also called sub optimal or inefficient performance) are not included in creating the 3D composite deficiency surface. According to one embodiment, the sub optimal performance score (deficiency score) for this type of nodal points representing operational facilities is depicted as points in the composite deficiency surface with an elevation on the map for visual emphasis. According to one embodiment, the nodal points may be depicted as an erected building where the height of the building represents the deficiency score and the base of the building represents the facility location.

Figure 5:
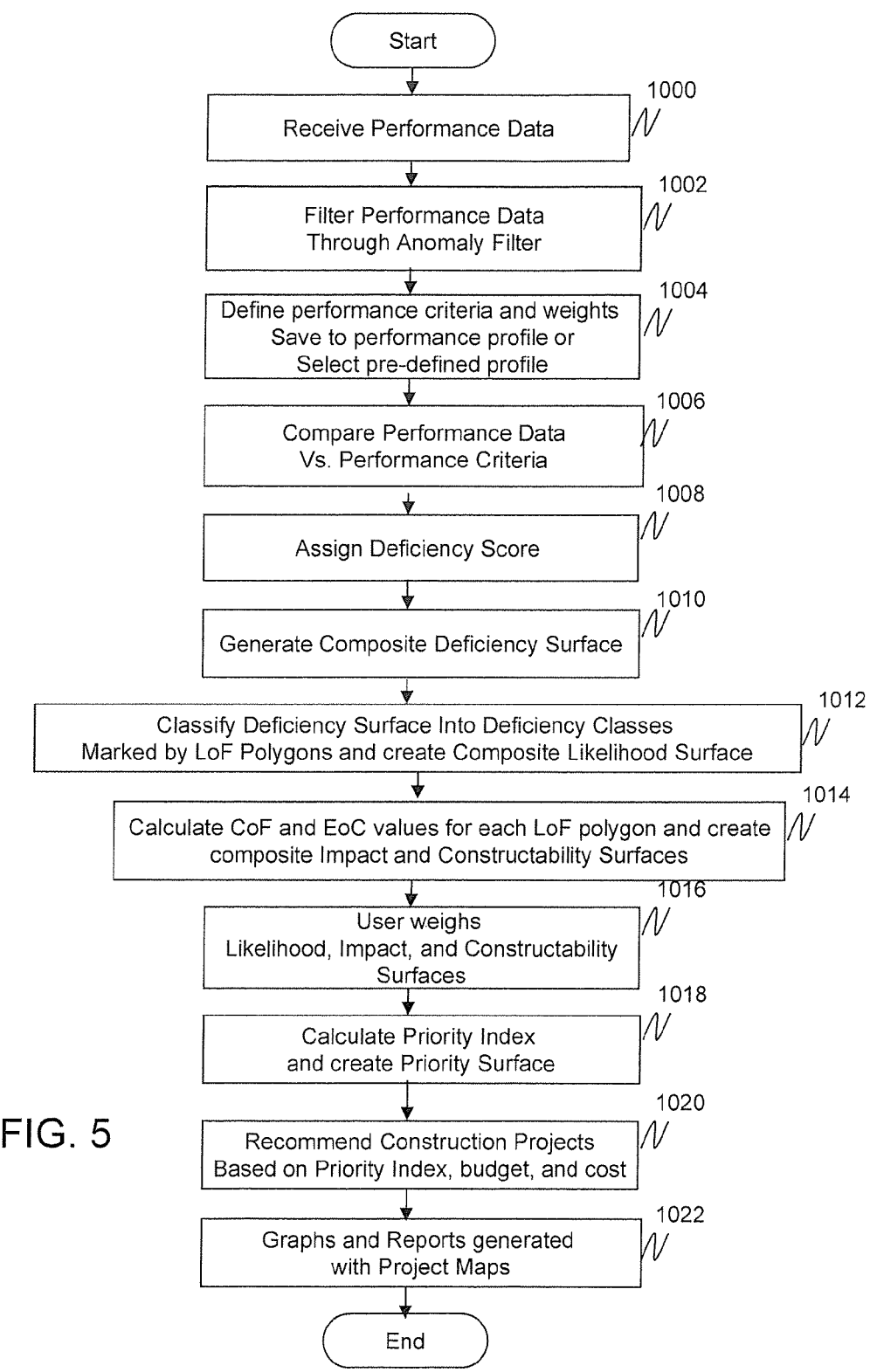
FIG. 5 is a flow diagram of a process for monitoring and managing a utility system according to one embodiment of the invention.

FIG. 5 is a flow diagram of a process for monitoring and managing a utility system according to one embodiment of the invention. The process may be described in terms of a software routine executed by a microprocessor of the computer device 500 based on instructions stored in memory. For example, the software routine may be executed by the various modules running on the computer device 500. A person of skill in the art should recognize that the routine executed by the deficiency module may be implemented via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and in step 1000, the deficiency module 508 receives performance data 90 for a particular utility device. If the utility device is a pipe, for example, the data may indicate whether there is a break on the pipe, whether there is headloss, the material of the pipe, the type of soil surrounding the pipe, and the age of the pipe. For example, an engineer in the field may visually inspect the utility device and input the detected data on a laptop, tablet, or other portable device for communicating to the server.

In step 1002, the deficiency module 508 may optionally invoke the data anomaly filter 120 to determine whether there are any anomalies in the received data. For example, the module may determine whether a value that is submitted is not within an acceptable range of values which may be stored, for example, in the mass storage device 506. If an anomaly is detected in the received data, the module may display the anomaly for visual attention and transmit an alert to prompt for correction of the data. The alert may be an audio and/or visual alert. According to one embodiment, the utility device producing the erroneous data may also be highlighted on a display map.

In step 1004, the user may define the performance criteria 532 for utility devices which may be saved as a performance profile, or select and invoke pre-configured performance profiles. The particular performance profile that is invoked depends on the manner in which the user has configured the performance expectations or performance criteria of the utility devices. For example, the user may choose a conservative profile (wherein the utility devices are expected to perform with least amount of stress), moderate profile (medium stress), aggressive profile (high stress), or disaster profile (extreme stress). According to one embodiment, during configuration of the system, the user may create his or her custom deficiency profile for a particular type of utility device or a group of devices with customized attributes, and/or weights for what-if analysis. Users can then save the custom profile in the mass storage device 506 for his/her own use later or for sharing with others in the utility, other utilities, and stake holders.

In step 1006, the deficiency module 508 compares the received performance data 90 against one or more performance criteria 530 in the selected performance profile. For example, the module may determine whether a value that is submitted indicates a performance deficiency such as pipe break, excessive headloss, or other deficiency associated with the monitored utility devices. The display module 512 may be invoked to display the deficiency of the device for visual attention and/or transmit an alert to prompt for further investigation and corrective action.

In step 1008, the deficiency module 508 assigns a deficiency score, also referred to as a Likelihood of Failure (LoF) score, to the utility device based on the comparison of the performance data against the performance criteria in the selected performance profile. Exemplary deficiency scores 542 are shown in FIGS. 3C and 3D.

According to one embodiment, the deficiency score for a device is a sum of weights that are triggered for each attribute of the device. The weights may be adjusted by a user during setup of the system by shuffling the attributes so that they appear in a different order, as is depicted in FIGS. 3A-3D.

In step 1010, the display module 512 generates a 3D deficiency surface based on the assigned deficiency scores, similar to the deficiency surface of FIG. 4. For example, areas of deficiencies are represented as mounds and areas of no deficiencies are represented as valleys. Transition from high deficiencies to low deficiencies is represented as slope of the mounds. According to one embodiment, the total number of deficiencies, weighted on each device including pipes, hydrants, and valves are used as elevation values to create mounds and valleys having interpolated surfaces.

In step 1012, the deficiency module 508 classifies the deficiency surface into one or more deficiency classes based on the computed deficiency scores, and each class is assigned, for example, a Likelihood of Failure (LoF) value equal to the aggregated deficiency score of the class. For example, the module may be configured to automatically classify the surface into five fixed classes (e.g. classes 1-5), with class 5 representing the highest deficiency value (LoF) and class 1 representing the lowest deficiency value. Of course, a person of skill in the art should recognize that more or less than five fixed classes may be used.

According to one embodiment, the composite deficiency surface is classified into a fixed number of classes using Jenks Natural Break Optimization or other statistical classification techniques such as Equal Interval (wherein range of values divided into number of classes), Equal Area (wherein each new class will represent similar amount of area), and the like, as is well understood by a person of skill in the art. For example, the Natural Break method seeks to reduce the variance within classes and maximize the variance between classes.

Figure 7B:
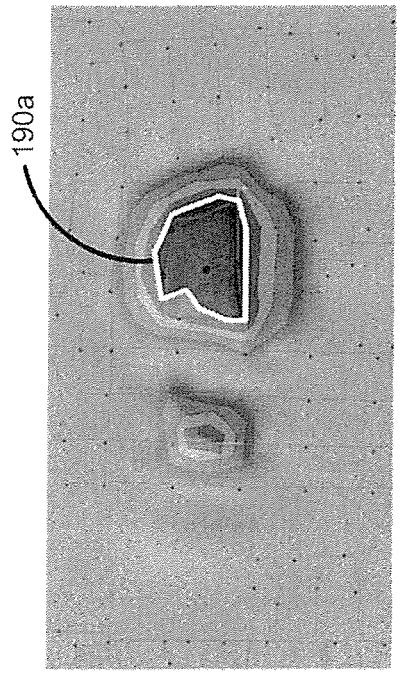
FIGS. 7A-7C are screen shots of the composite deficiency surface of FIG. 4 showing various likelihood of failure polygons according to one embodiment of the invention.
Figure 7C:
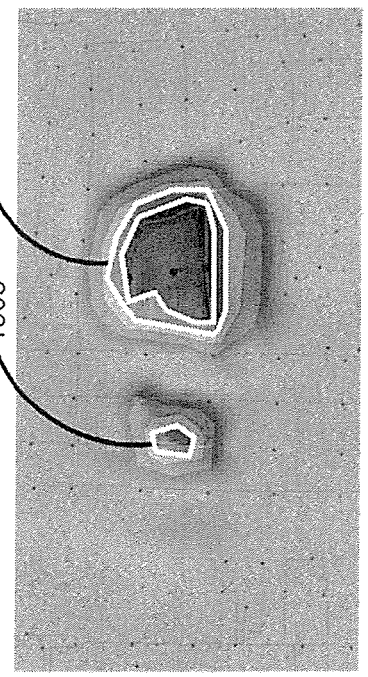
Figure 7A:
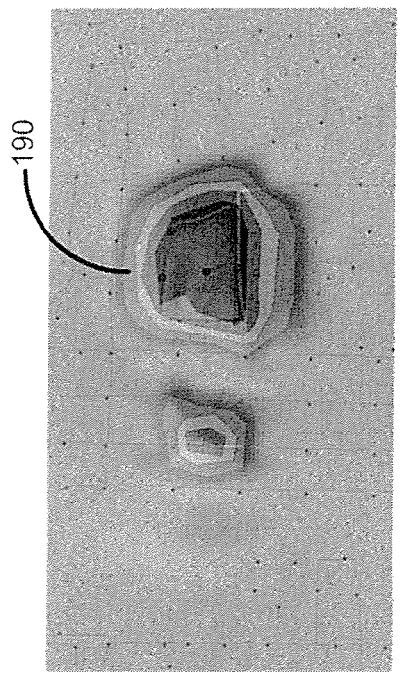

Users may also specify a large number of classes (e.g. 100) so that they can study the system in greater detail. According to one embodiment, the classified areas are identified as LoF polygons which span a particular area of the deficiency surface. FIG. 7A is a screen shot of the composite deficiency surface 550 of FIG. 4 showing various LoF polygons 190. The classification information may be maintained in a table stored in the mass storage device 506, such as a Table 1 depicted below. In the example of Table 1, the area of the surface identified by polygon 4 is assigned a class of 5 since it has the highest deficiency value (LoF). FIG. 7B is a screen shot of a composite deficiency diagram where a LoF polygon 190a with the highest LoF value which is assigned to class 5, is visually highlighted.

In the example of Table 1, the area of the surface identified by polygon 1 is assigned a class of 1 since it has the lowest deficiency score. Spatially disconnected classes of the same deficiency score can exist in multiple parts of the system. In the example of Table 1, there are two instances of class 4 with a LoF of 40, two instances of class 3 with a LoF of 30, two instances of class 2 with a LoF of 20, and thus creating a total of eight LoF polygons with five classes. FIG. 7C is a screen shot of a composite deficiency diagram where spatially disconnected LoF polygons 190b-c with same class value (class 4) are visually highlighted.

TABLE 1

| OBJECTID | Shape | Id | ClassID | Shape_Length | Shape_Area | LoF | CoF | EoC |
|---|---|---|---|---|---|---|---|---|
| 1 | Polygon | 1 | 4 | 796.209098 | 40649.979408 | 40 | 80 | 90 |
| 5 | Polygon | 5 | 4 | 5629.77579 | 229268.860419 | 40 | 40 | 30 |
| 4 | Polygon | 4 | 5 | 2617.869204 | 423055.511031 | 50 | 20 | 40 |
| 2 | Polygon | 2 | 3 | 2052.733922 | 73333.629394 | 30 | 30 | 40 |
| 7 | Polygon | 7 | 2 | 7533.254216 | 330043.632737 | 20 | 20 | 50 |
| 6 | Polygon | 6 | 3 | 6492.911036 | 243800.978468 | 30 | 30 | 20 |
| 3 | Polygon | 3 | 2 | 3164.457144 | 133315.104844 | 20 | 20 | 30 |
| 8 | Polygon | 8 | 1 | 67580.182085 | 227459532.303834 | 10 | 10 | 40 |

(1 out of 8 Selected)

According to one embodiment of the invention, the display module 512 may be invoked to generate a 3D composite LoF surface using the LoF values as elevation.

In step 1014, the deficiency module also calculates a consequence of failure (CoF) value and an ease of construction (EoC) value for the area depicted by each LoF polygon. The CoF value represents the impact that would be caused due to one or more utility devices failing in the area marked by the corresponding LoF polygon. According to one embodiment, the CoF value is based on data such as a total number of customers, total number of critical customers, total demand, street type, businesses, and the like, that are associated with the area marked by the LoF polygon. The data may be obtained from one or more information sources such as, for example, via manual input, database queries, web searches, and the like. A person of skill in the art should recognize, however, that the present invention is not limited to the use of above mentioned data to compute CoF values and can use any available data that can identify impacts. According to one embodiment, these inputs are prioritized using weights similar to the way asset attributes are weighted using weights. FIG. 6A is an exemplary layout diagram of a table including exemplary impact criteria 140 and associated weights 160b for various impact attributes according to one embodiment of the invention. The weights may also be shuffled, as shown in FIG. 6B.

Figure 8:
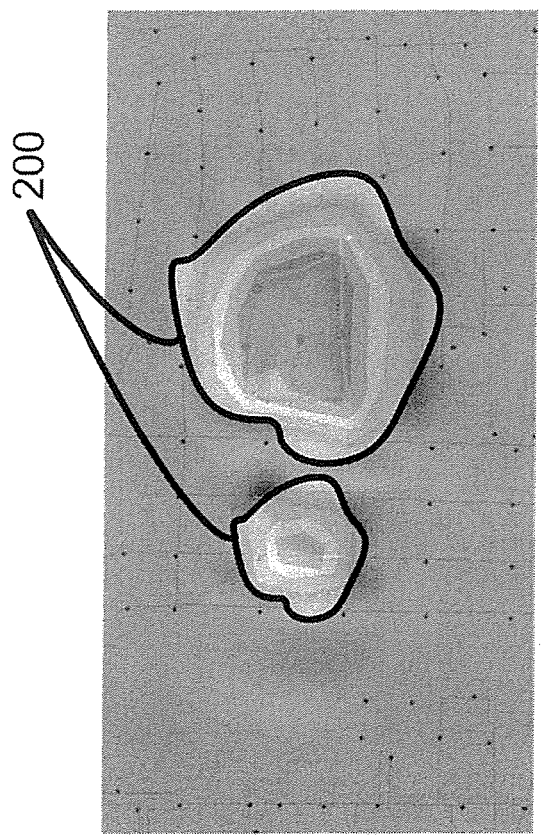
FIG. 8 is a screen shot of the composite deficiency surface of FIG. 4 showing cost of failure polygons according to one embodiment of the invention.

According to one embodiment, the area for which the CoF value is calculated may be modified based on operability of a valve at the periphery of the LoF polygon. According to one embodiment, if a valve at the periphery is inoperable, the polygon is extended until operable valves are found. In this regard, the module performs a network trace to find valves that are immediately connected to the identified inoperable valve, and when closed, can isolate the LoF polygon. If the newly identified valve is also inoperable, the process is repeated until an operable valve is found to isolate the LoF polygon. During this outward search, the CoF polygon expands to include more and more customers, demands, businesses, and the like. FIG. 8 is a screen shot of the composite deficiency surface 550 of FIG. 4 showing CoF polygons 200 according to one embodiment of the invention. The extended polygon is then used to assess the impact of the failure.

FIGS. 6C and 6D show tables including exemplary CoF values 600a and 660b for the criteria and weights in respectively FIGS. 6A and 6B. According to one embodiment of the invention, a 3-dimensional composite impact surface is created using the CoF values as elevation.

According to one embodiment, the EoC value represents the ease of performing construction in the area marked by the corresponding LoF polygon. According to one embodiment, the ease of construction is inversely related to the cost of construction. For example, projects that are difficult to construct are also more costly. For example, projects within a LoF that intersects with a railway line, highway, or easement are difficult to construct and expensive. Conversely, a project within a LoF that overlaps with a dirt road with minimal traffic impact is easy to construct and less expensive to construct and maintain. According to one embodiment, the EoC value is based on data such as land use, planned street projects, intersection with railway line, highways, easements, and the like. A person of skill in the art should recognize that the present invention is not limited to the use of this data to compute EoC values and may use any available data configured to identify ease or cost of construction as will be evident to a person of skill in the art. According to one embodiment, the data may be obtained from one or more information sources such as, for example, via manual input, database queries, web searches, and the like. According to one embodiment, these inputs are prioritized using weights similar to the way asset attributes are weighted using weights. FIG. 9A shows a table with exemplary EoC criteria 150 and associated weights 160c according to one embodiment of the invention. The weights may also be shuffled, as shown in FIG. 9B.

FIGS. 9C and 9D show tables with exemplary CoF values 610a and 610b for the criteria and weights in respectively FIGS. 9A and 9B. According to one embodiment of the invention, a 3-dimensional composite constructability surface may be created using the EoC values as elevation.

According to one embodiment, different profiles (e.g. conservative, moderate, aggressive, and disaster) may be provided for user selection for computing the CoF and EoC values.

Figure 10:
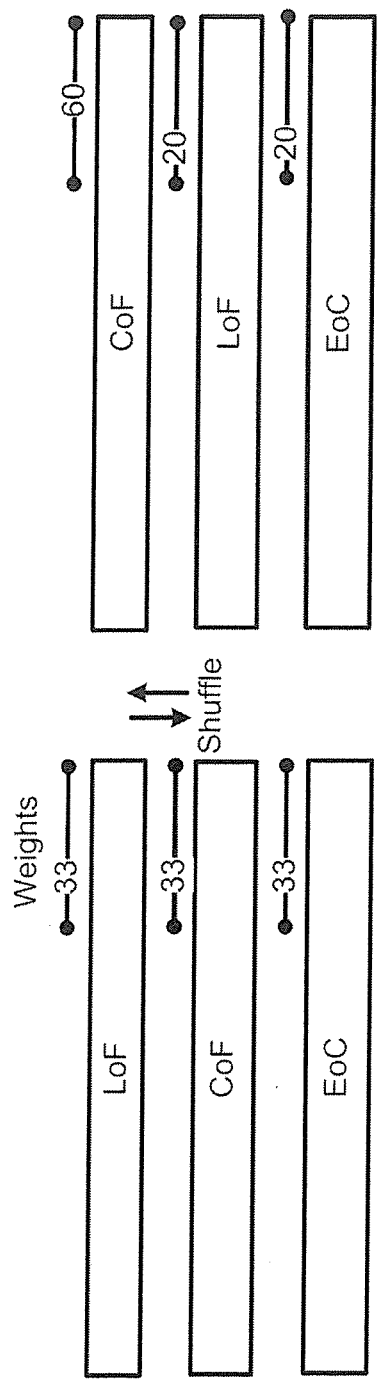
FIG. 10 is a conceptual layout diagram of shuffling likelihood of failure, cost of failure, and ease of construction values according to one embodiment of the invention.

In step 1016, a user prioritizes the LoF, CoF, and EoC surfaces by assigning weights (or using a shuffling mechanism) for calculating a priority index. FIG. 10 is a conceptual layout diagram of shuffling LoF, CoF, and EoC values according to one embodiment of the invention. The shuffling may be via a drag and drop mechanism or any other shuffling mechanism conventional in the art.

In step 1018, the deficiency module 508 calculates a priority index for the area marked by the corresponding LoF polygon. According to one embodiment, the priority index is based on the deficiency value (LoF) of the area depicted by the polygon, the impact of the failure as represented by the corresponding CoF value, and the ease of construction as depicted by the corresponding EoC value. According to one embodiment, the deficiency module 508 is configured to calculate the index by multiplying LoF, CoF, and EoC values from respective surfaces. A final index surface is created based on the calculated priority index. As discussed above, users may also apply weights to prioritize LoF, CoF, and EoC surfaces.

Table 2 includes in the last column exemplary priority indices for the polygons included in Table 1 with equal priority assigned to LoF, CoF, and EoC (33.33% each).

According to one embodiment of the invention, a 3D composite priority surface is created using the priority index values as elevation.

In step 1020, the project module 516 is invoked for recommending a construction project based on the priority index of the various LoF polygons. In this regard, the module identifies a number of projects to create based on input criteria such as, for example, a user specified number of projects, available budget, unit cost of constructing the assets, and the like. According to one embodiment, the project module identifies LoF polygons to be grouped into a particular project.

According to one embodiment, the grouping of LoF polygons depends on the priority index of the LoF polygons as well as the spatial contiguity of those polygons. Grouping of the LoF polygons is accomplished by known data classification methods such as, for example, Natural Breaks Classification (e.g. Jenks Natural Break Optimization or other statistical classification techniques such as Equal Interval, Equal Area, and the like) that determines the best arrangement of values into different classes. The method seeks to reduce the variance within classes and maximize variance between classes. For example, if a total of five projects are to be created, adjacent polygons that have an index with least variance are merged to form a new polygon. For example, polygons 4 and 5 in the example of Table 2 are merged to form a new polygon, and the new polygon is identified as a specific project. Some polygons (e.g. polygon 1) may have very high variance between neighboring classes and are not merged with any class. Those polygons may be identified as individual projects. Users may specify a fewer number of classes (e.g. 3) so that they can aggregate LoF polygons into a manageable number of projects.

The recommended projects may be transmitted for display on the end user device 514 and/or stored in a table in the mass

TABLE 2

| Id | ClassID | Shape_Length | Shape_Area | LoF | CoF | EoC | SedaruIndex |
|---|---|---|---|---|---|---|---|
| 1 | 4 | 796.209098 | 40649.979408 | 40 | 80 | 90 | 288000 |
| 5 | 4 | 5629.77579 | 229268.860419 | 40 | 40 | 30 | 48000 |
| 4 | 5 | 2617.869204 | 423055.511031 | 50 | 20 | 40 | 40000 |
| 2 | 3 | 2052.733922 | 73333.629394 | 30 | 30 | 40 | 36000 |
| 7 | 2 | 7533.254216 | 330043.632737 | 20 | 20 | 50 | 20000 |
| 6 | 3 | 6492.911036 | 243800.978468 | 30 | 30 | 20 | 18000 |
| 3 | 2 | 3164.457144 | 133315.104844 | 20 | 20 | 30 | 12000 |
| 8 | 1 | 67580.182085 | 227459532.303834 | 10 | 10 | 40 | 4000 |

(2 out of 8 Selected)

LoFPolygons storage device 506 for retrieval by the end user device. Table 3 is an exemplary table which identifies three projects along with shape length and area of the associated project polygons.

TABLE 3

| OBJECTID* | Shape* | ProjectID | Shape_Length | Shape_Area |
|---|---|---|---|---|
| 1 | Polygon | 1 | 796.209098 | 40649.979408 |
| 2 | Polygon | 2 | 2052.733922 | 73333.629394 |
| 3 | Polygon | 3 | 3011.906586 | 652324.37145 |

(1 out of 3 Selected)

Figure 11:
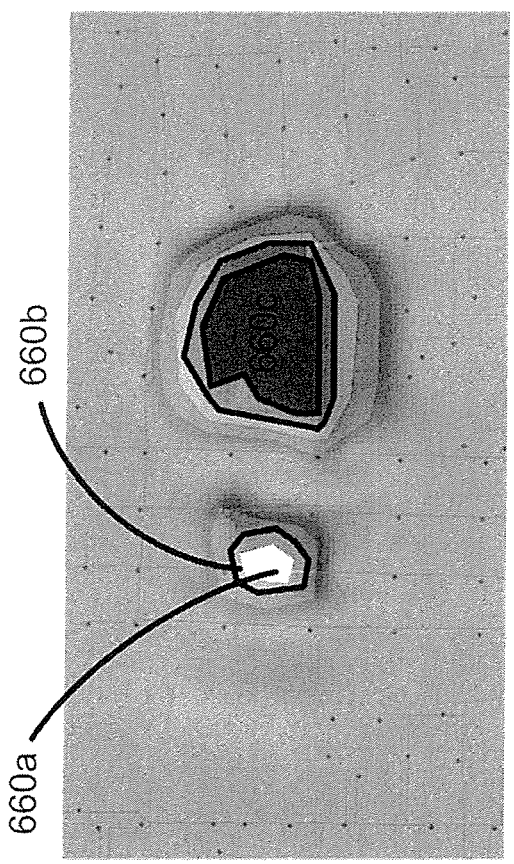
FIG. 11 is a screen shot of the composite deficiency surface of FIG. 4 showing various project polygons according to one embodiment of the invention.

FIG. 11 is a screen shot of the composite deficiency surface 550 of FIG. 4 showing the project polygons 660a-660c identified in Table 3 according to one embodiment of the invention. By highlighting the project polygons, a location of the projects may also be discerned.

Once the final list of projects is identified, users may choose to merge all projects that are within the extent of its CoF polygon so that once a particular area is isolated for project work, other projects that are within the isolated area can also be constructed. Such merge will ignore the variance of individual projects that are merged.

Figure 12:
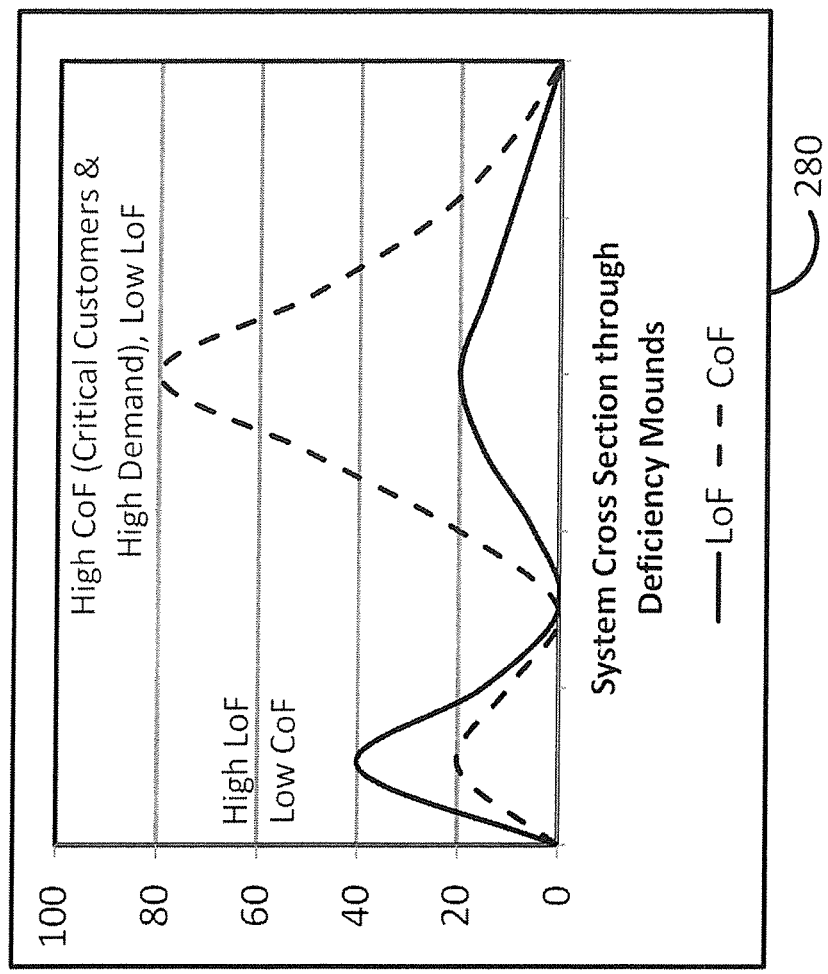
FIG. 12 is an exemplary graph of a system cross section through deficiency mounds according to one embodiment of the invention.

In step 1022, the project module 516 may further generate graphs and reports, such as graphs 280 and reports 290 of FIGS. 12 and 13, respectively, for the projects that include different value indicators for each identified project. Such value indicators may include dollar per customer (DpC) values 300 (cost of the project/number of customers impacted), dollar per deficiency (DpD) values 310 (cost of project/number of deficiencies addressed), and/or dollar per customer complaints (DpCC) values 320 (cost of project/number of customer complaints addressed).

According to one embodiment, a utility user may restrict the monitoring and management of utility systems in a study area. As an example of study area, water distribution service areas with significant elevation differences are divided into areas of similar elevations and therefore pressures (Pressure Zones). Another example of a study area are District Metering Areas (DMAs) where the service area is divided into several metering districts with accurate bulk water meters installed at the entry point into these districts. Yet another example is a city subdivision or acquired system wherein the utility is interested to evaluate the new system's assets under a predefined set of criteria. Users may want to limit the focus of a study area only within a selected pressure zone, DMA, or any other geographic, or administrative sub region of the system.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for monitoring and managing a plurality of utility devices installed throughout a geographic area, the method comprising:
   receiving performance data for each of the plurality of utility devices;
   comparing the performance data against one or more performance criteria;
   assigning a deficiency value to each of the plurality of utility devices based on the comparison;
   generating a composite deficiency surface based on the deficiency values of the plurality of utility devices;
   classifying one or more areas of the composite deficiency surface into one or more deficiency classes, wherein each of the one or more deficiency classes is associated with a range of deficiency values;
   identifying a particular area on the composite deficiency surface associated with a particular deficiency class;
   determining a priority index for the identified area based on the particular deficiency value;
   classifying one or more of the identified areas of the composite deficiency surface into one or more construction projects based on the priority index for the corresponding area; and
   recommending at least one of the one or more construction projects.

2. The method of claim 1, wherein each of the plurality of utility devices is selected from a group consisting of a pipe and hydrant.

3. The method of claim 1 further comprising:
   comparing the performance data of each of the plurality of utility devices against a preset value stored in a data store for determining anomaly in the performance data; and
   displaying the determined anomaly for visual attention.

4. The method of claim 1 further comprising:
   visually highlighting the utility device based on the comparison of the performance data against the performance criteria.

5. The method of claim 1, wherein the composite deficiency surface is a 3-dimensional surface including mounds and valleys representing deficiencies of the utility devices in the geographic area.

6. The method of claim 1, wherein the composite 3-dimensional surface deficiency surface is classified into deficiency areas representing deficiencies and likelihood of failure of the utility devices in the geographic area.

7. The method of claim 1, wherein the deficiency areas are grouped into a preset number of projects for addressing the deficiencies of the utility devices in the geographic area.

8. The method of claim 1 further comprising:
filtering the performance data against one or more data anomaly criteria.

9. The method of claim 1 further comprising:
determining impact of failure of one or more of the utility devices in the identified area.

10. The method of claim 1 further comprising:
determining an ease of construction for the identified area.

11. The method of claim 1 further comprising:
determining an actual cost of construction of assets within the project areas.

12. The method of claim 1 further comprising:
reporting the value of each project with respect to number of customers positively affected, number of deficiencies, and number of customer complaints addressed.

13. The method of claim 1 further comprising:
displaying a map highlighting a location of a project.

14. The method of claim 1, wherein the plurality of utility devices includes valves.

15. The method of claim 1 further comprising:
highlighting pumps and tanks as deficiency points.

16. The method of claim 1 further comprising:
displaying one or more of the composite deficiency surface, likelihood of failure surface, impact surface, constructability surface, and priority index surface.

17. A system for monitoring and managing a plurality of utility devices installed throughout a geographic area, the system comprising:
a processor; and
memory coupled to the processor and storing computer instructions therein, the computer instructions for being executed by the processor, the computer instructions including:
receiving performance data for each of the plurality of utility devices;
comparing the performance data against one or more performance criteria;
assigning a deficiency value to each of the plurality of utility devices based on the comparison;
generating a composite deficiency surface based on the deficiency values of the plurality of utility devices;
classifying one or more areas of the composite deficiency surface into one or more deficiency classes, wherein each of the one or more deficiency classes is associated with a range of deficiency values;
identifying a particular area on the composite deficiency surface associated with a particular deficiency class;
determining a priority index for the identified area based on the particular deficiency value;
classifying one or more of the identified areas of the composite deficiency surface into one or more construction projects based on the priority index for the corresponding area; and
recommending at least one of the one or more construction projects.

18. The system of claim 17 wherein the program instructions further include:
comparing the performance data of each of the plurality of utility devices against a preset value stored in a data store for determining anomaly in the performance data; and
displaying the determined anomaly for visual attention.

19. The system of claim 17, wherein the composite deficiency surface is a 3-dimensional surface including mounds and valleys representing deficiencies of the utility devices in the geographic area.

20. The system of claim 17, wherein the program instructions further include:
grouping the deficiency areas into a preset number of projects for addressing the deficiencies of the utility devices in the geographic area.

* * * * *